No. 806,521. PATENTED DEC. 5, 1905.
J. CHILDS.
CLOTHES FASTENER.
APPLICATION FILED DEC. 24, 1904.
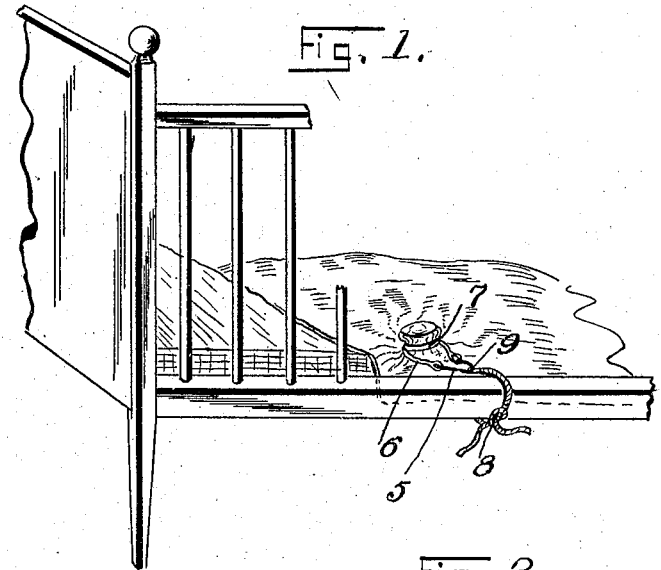
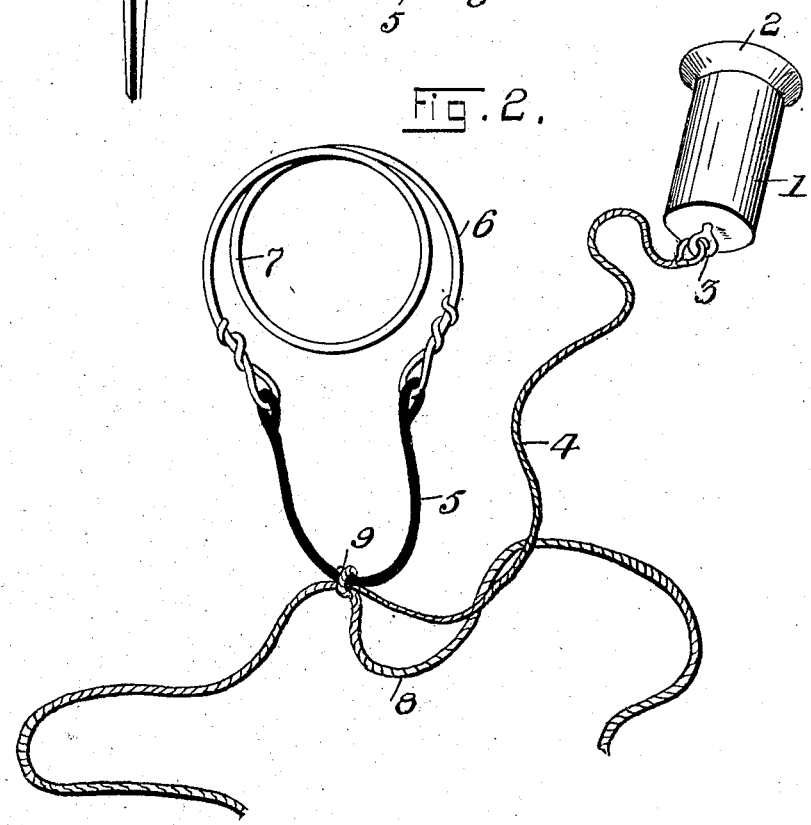
Witnesses:
C. Klostermann
K. H. Butler
Inventor.
Jesse Childs.
H. C. Evert & Co.
by Attorneys.

UNITED STATES PATENT OFFICE.

JESSE CHILDS, OF HITES, PENNSYLVANIA.

CLOTHES-FASTENER.

No. 806,521.	Specification of Letters Patent.	Patented Dec. 5, 1905.

Application filed December 24, 1904. Serial No. 238,244.

*To all whom it may concern:*

Be it known that I, JESSE CHILDS, a citizen of the United States of America, residing at Hites, in the county of Allegheny and State of Pennsylvania, have invented certain new and useful Improvements in Clothes-Fasteners, of which the following is a specification, reference being had therein to the accompanying drawings.

This invention relates to certain new and useful improvements in fasteners, and more particularly to that type of fastener which is employed for retaining bedclothes upon a bed.

The object of this invention is to provide a clothes-fastener of the resilient character which will permit of the occupant of the bed moving beneath the bedclothes without displacing the bedclothes retained upon the bed.

Another object of this invention is to provide a fastener which can be easily and quickly secured to bedclothes without injuring the same and can be readily detached when it is desired not to use the fastener.

With the above and other objects in view reference will be had to the drawings accompanying this application, wherein like numerals of reference designate corresponding parts throughout both views, in which—

Figure 1 is a fragmentary perspective view of a crib or bed, illustrating my improved fastener as being used in connection with bedclothes; and Fig. 2 is a perspective view of my improved clothes-fastener.

The clothes-fastener as constructed by me is applicable to any type of bed or crib upon which infants or children sleep. In Fig. 1 of the drawings I have illustrated one of my improved fasteners as being used in connection with a sheet, spread, or the like bedclothes; but it will of course be understood that a plurality of these fasteners are used, a certain number upon one side of the bed and a certain number upon the opposite side, whereby the bedclothes will be retained upon the bed.

The fastener as constructed by me is made of a resilient character which will permit the occupant or occupants of the bed to move without displacing the bedclothes or covers, and another novel feature of my improved fastener resides in the manner in which I secure the same to the bedclothes.

In Fig. 2 of the drawings a complete view of the fastener is illustrated, and the reference-numeral 1 designates a substantially spool-shaped member to which the bedclothes are attached. The member 1 carries an enlarged beveled head 2, and to the opposite end of the member is attached, as indicated at 3, a cord or small chain 4, to the opposite end of which is secured the elastic or resilient cord or band 5. The elastic cord or band, as indicated in the accompanying drawings, is formed of rubber, and to the ends of this rubber band I secure the ends of a piece of wire 6. This piece of wire is bent to form a loop 7. The normal position of the piece of wire is illustrated in Fig. 2 of the drawings, and to secure the bedclothes upon the member 1 I place the clothes down over the member and place the loop 7 of the piece of wire 6 over the member 1. On account of the resilient nature of the wire 6 the bedclothes will be retained upon the member, and in order to secure the fastener upon the bed I have provided the string 8, which is connected to the string 4 and the elastic band 5, as indicated at 9.

The clothes-fastener is secured by the string 8 to the side rail or slats of the bed, as clearly illustrated in Fig. 1 of the drawings. Should the occupant of the bed raise the covers, the fastener will become more firmly engaged upon the same on account of the ends of the wire 6 being drawn together, which will cause the loop 7 to more firmly engage the member 1. The elastic band 5 of the fastener will permit of the covers being moved considerably without displacing the same from the bed.

The manner of detaching my improved clothes-fastener permits of the same being attached to any part of the bedclothes.

It will be noted that various changes may be made in the details of construction without departing from the general spirit and scope of the invention.

What I claim, and desire to secure by Letters Patent, is—

1. In a device of the character described, a member having a head, a cord attached to said member, a spirally-coiled wire loop, an elastic member having its ends attached to the ends of the wire loop, said elastic member connected intermediate its ends to said cord, and means attached to said cord and elastic member for securing the device to a bed.

2. A device for securing clothes to a bed comprising a member 1 having a head on one end, a resilient wire loop adapted to wrap around the member and hold the clothes over the head of said member, an elastic member connecting the ends of said loop, a flexible connection between the member 1 and the elastic member, and a flexible member connected to the elastic member for securing the device to a bed, substantially as described.

3. In a device of the character described, the combination of a member having a head, a cord attached to said member, a spirally-coiled wire loop, and an elastic cord having its ends attached to the ends of said wire loop, said elastic cord being connected at its center to said first-named cord, and a third cord connected to the said elastic cord and adapted to secure the device to a bed.

In testimony whereof I affix my signature in the presence of two witnesses.

JESSE CHILDS.

Witnesses:
R. K. NORMAN,
THOMAS NORMAN, Jr.